United States Patent
Tkac et al.

(10) Patent No.: US 9,388,846 B2
(45) Date of Patent: Jul. 12, 2016

(54) CORE FOR CAST CRANKSHAFT

(71) Applicant: GM Global Technology Operations LLC, Detroit, MI (US)

(72) Inventors: Ronald M. Tkac, Brighton, MI (US); Edward R. Romblom, Dewitt, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 76 days.

(21) Appl. No.: 14/489,568

(22) Filed: Sep. 18, 2014

(65) Prior Publication Data

US 2016/0084294 A1 Mar. 24, 2016

(51) Int. Cl.
  *F16C 3/04* (2006.01)
  *B22C 9/10* (2006.01)
  *F16C 3/08* (2006.01)

(52) U.S. Cl.
  CPC ... *F16C 3/08* (2013.01); *B22C 9/10* (2013.01); *F16C 2220/02* (2013.01)

(58) Field of Classification Search
  CPC ............... F16C 3/04; F16C 3/06; F16C 3/08; F16C 3/10; F16C 3/14; F16C 3/16; F16C 2220/02; B21K 1/08; Y10T 74/2173; B22C 9/10
  See application file for complete search history.

(56) References Cited

U.S. PATENT DOCUMENTS

| 2,109,083 | A | * | 2/1938 | Campbell | F16C 3/08 384/429 |
| 2,196,422 | A | * | 4/1940 | Meyer | F16C 3/08 74/605 |
| 2,364,109 | A | * | 12/1944 | Taylor | F16C 3/12 228/135 |
| 8,533,946 | B2 | | 9/2013 | Murrish et al. | |
| 2007/0193405 | A1 | * | 8/2007 | Shibano | B22C 9/10 74/596 |
| 2015/0275960 | A1 | * | 10/2015 | Kamiya | F16C 3/08 74/596 |

FOREIGN PATENT DOCUMENTS

| DE | 512837 | C | * | 11/1930 | F16C 3/16 |
| DE | 714558 | C | * | 12/1941 | F16C 3/08 |
| GB | 311288 | A | * | 2/1930 | F02B 77/089 |
| GB | 481928 | A | * | 3/1938 | F16C 3/08 |
| IN | WO 2011121611 | A1 | * | 10/2011 | F16C 3/10 |

* cited by examiner

*Primary Examiner* — Adam D Rogers
(74) *Attorney, Agent, or Firm* — Harness, Dickey & Pierce, P.L.C.

(57) ABSTRACT

A core structure for a cast crankshaft is provided which eliminates the need to machine and install plugs in one or more of the main bearing lightening holes. This is achieved by configuring the core structure to take out all but a thin wall of material in the center of the main bearing journals.

7 Claims, 5 Drawing Sheets

CORE FOR CAST CRANKSHAFT

FIELD

The present disclosure relates to a core structure for a cast crankshaft.

BACKGROUND

This section provides background information related to the present disclosure which is not necessarily prior art.

Typical practice for engine dry sump lubrication systems with high RPM (8000 RPM+) and high-performance is to have individual crankcase bays in order to prevent bay-to-bay pumping losses. To do this with main journals that have been hollowed for weight reduction, a machining hole in the main journal needs to be plugged to prevent bay-to-bay pumping.

It is desirable in the art to provide a crankshaft that does not require the additional machining and plug pressing operations. In addition, it is desirable to provide a lower mass crankshaft with greater mass reduction as compared to the machined method which only has limited hollowing capability to take out material from a crankshaft.

SUMMARY

This section provides a general summary of the disclosure, and is not a comprehensive disclosure of its full scope or all of its features.

A core structure for a cast crankshaft is provided which eliminates the need to machine and install plugs in one or more of the main bearing lightening holes. This is achieved by configuring the core structure to take out all but a thin wall of material in the center of the main bearing journals. The core structure includes a pair of end main bearing core segments with a first pair of counterweight core segments connected to the pair of end main bearing core segments by a first pair of pass-through core segments. A pair of intermediate crank pin core segments are connected to the first pair of counterweight core segments by a second pair of pass-through core segments. A pair of intermediate main bearing journal core segments are adjacent to the first pair of counterweight core segments which straddle the pair of intermediate main bearing journal core segments with a void region between the pair of intermediate main bearing journal core segments and the first pair of counterweight core segments. A second pair of counterweight core segments are connected to the pair of intermediate main bearing journal core segments by a third pair of pass-through core segments. A pair of end crank pin core segments are connected to the second pair of counterweight core segments by a fourth pair of pass-through core segments. The void region between the pair of intermediate main bearing journal core segments and the first pair of counterweight core segments allows the core structure to take out all but a thin wall of material in the center of the main bearing journals that eliminate the need to install plugs. The thin wall of material blocks the flow of oil from going through the main bearing journal but still enables mass-reduction within the main bearing journal.

The core structure of the present disclosure provides an improvement over a crankshaft with plugs because it has the potential to eliminate machining and plug-pressing operations and to result in a lower mass crankshaft because the cast structure allows the removal of more material than the machining techniques. The core structure can be made as a single or multi-piece core Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
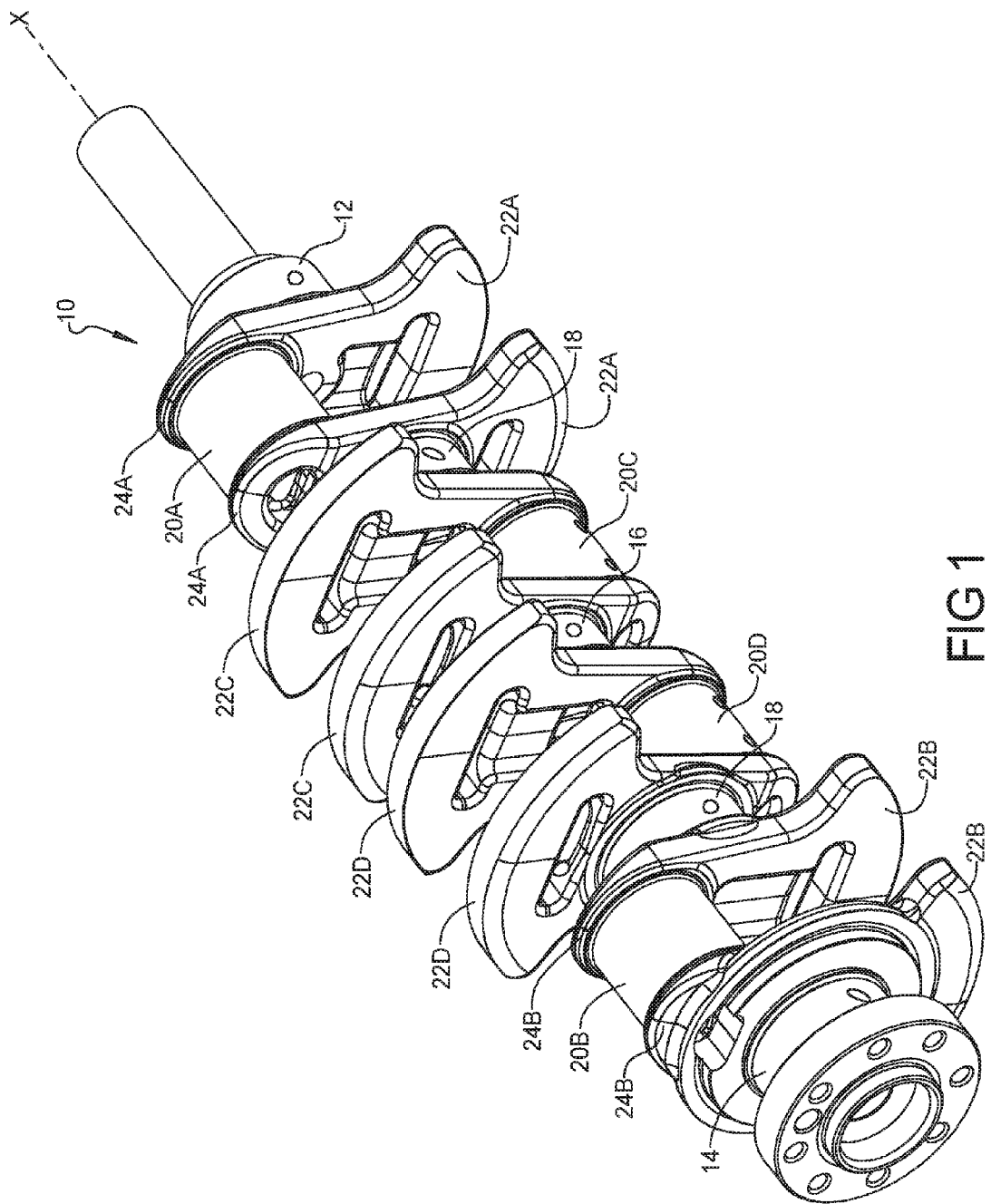
FIG. 1 is a plan view of an exemplary cast crankshaft according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exemplary cast crankshaft 10 having hollow sections formed by the core structure according to the principles of the present disclosure will now be described. The cast crankshaft 10 can include a front main bearing journal 12, a rear main bearing journal 14, a center main bearing journal 16 and a pair of intermediate main bearing journals 18 that are all linearly aligned along a center axis X. The cast crankshaft 10 includes a pair of end crank pins 20A, 20B connected to the respective front and rear main bearing journals 12, 14 and a pair of intermediate crank pins 20C, 20D connected between the center main bearing journal 16 and the respective intermediate main bearing journals 18. The crank pins 20A-20D are offset from the center axis X. Counterweights 22A-22D are connected to the respective crank pins 20A-20D on an opposite side of the center axis X from the crank pins 20A-20D. Each of the crank pins 20A-20D is flanked by a respective pair of crank webs 24A-24D which connect the crank pins 20A-20D to the adjacent main bearing journals 12-18 with the counterweights 22A-22D being generally within a same orthogonal plane as the crank webs 24A-24D. The counterweights 22A-22D counterbalance the mass of the crank pins 20A-20D and a lower portion of the connecting rods.

Figure 2:
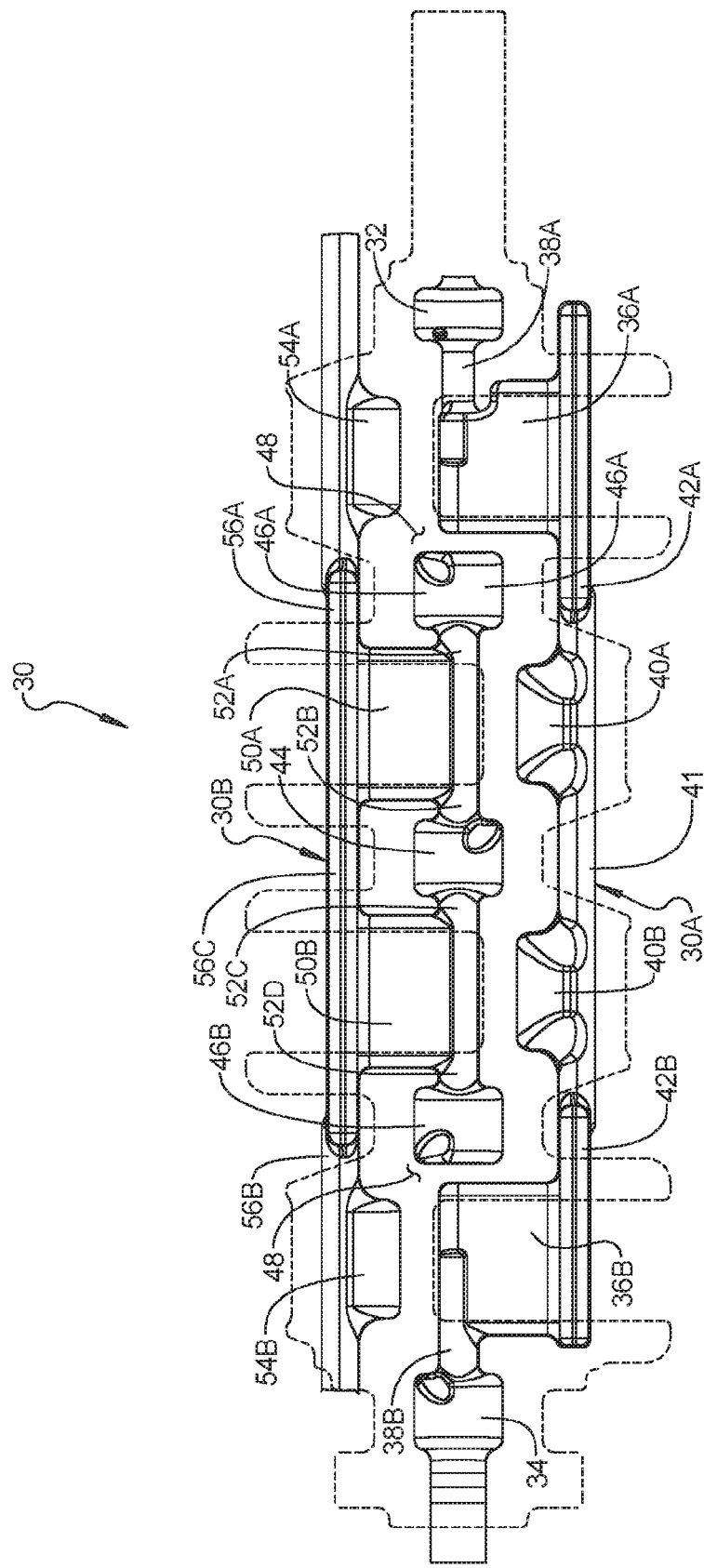
FIG. 2 is a plan view of a multi-piece core design with the crankshaft shown in phantom for illustrative purposes.

With reference to FIG. 2, a multi-piece core structure 30 for the cast crankshaft 10 shown in FIG. 1 will now be described. The core structure 30 includes a first core member 30A and a second core member 30B. The first core member 30A includes a pair of end main bearing core segments 32, 34 that are provided to form the hollow segments within the forward and rear main bearing journals 12, 14, respectively. A first pair of counterweight core segments 36A, 36B are connected to the pair of end main bearing core segments 32, 34 by a first pair of pass-through core segments 38A, 38B. The counterweight core segments 36A, 36B are so named because they define a region between respective pairs of counterweights 22A, 22B of the cast crankshaft 10. The pass-through core segments 38A-38B are so named because they pass-through the crank webs 24A, 24B and define a hollow region therein along the center axis X. A pair of intermediate crank pin core segments 40A, 40B are connected to one another by connecting core piece 41 and to the first pair of counterweight core segments 36A, 36B by extensions 42A, 42B of the counterweight core segments that pass through portions of the counterweights 22A, 22B as well as portions of the intermediate crank webs 24C, 24D, respectively.

The second core member 30B includes a center main bearing journal core segment 44 and a pair of intermediate main bearing journal core segments 46A, 46B. The pair of intermediate main bearing journal core segments 46A, 46B are provided to define the hollow region within the intermediate main bearing journals 18 and the center main bearing journal core segment 44 is provided to define the hollow region within the center main bearing journal 16. The intermediate main bearing journal core segments 46A, 46B are adjacent to and straddled by the first pair of counterweight core segments 36A, 36B of the first core member 30A. A pair of void regions 48 are provided between the pair of intermediate main bearing journal core segments 46A, 46B and the first pair of counterweight core segments 36A, 36B. A second pair of intermediate counterweight core segments 50A, 50B are connected between respective ones of the pair of intermediate main bearing journal core segments 46A, 46B and the center main bearing journal core segment 44 by pass-through core segments 52A-52D which pass through the crank webs 24C, 24D of the crankshaft 10. A pair of end crank pin core segments 54A, 54B are connected to the second pair of intermediate counterweight core segments 50A, 50B by extensions 56A, 56B of the counterweight core segments 50A, 50B. The pair of intermediate counterweight core segments 50A, 50B can be connected one another by an extension 56C.

Figure 3:
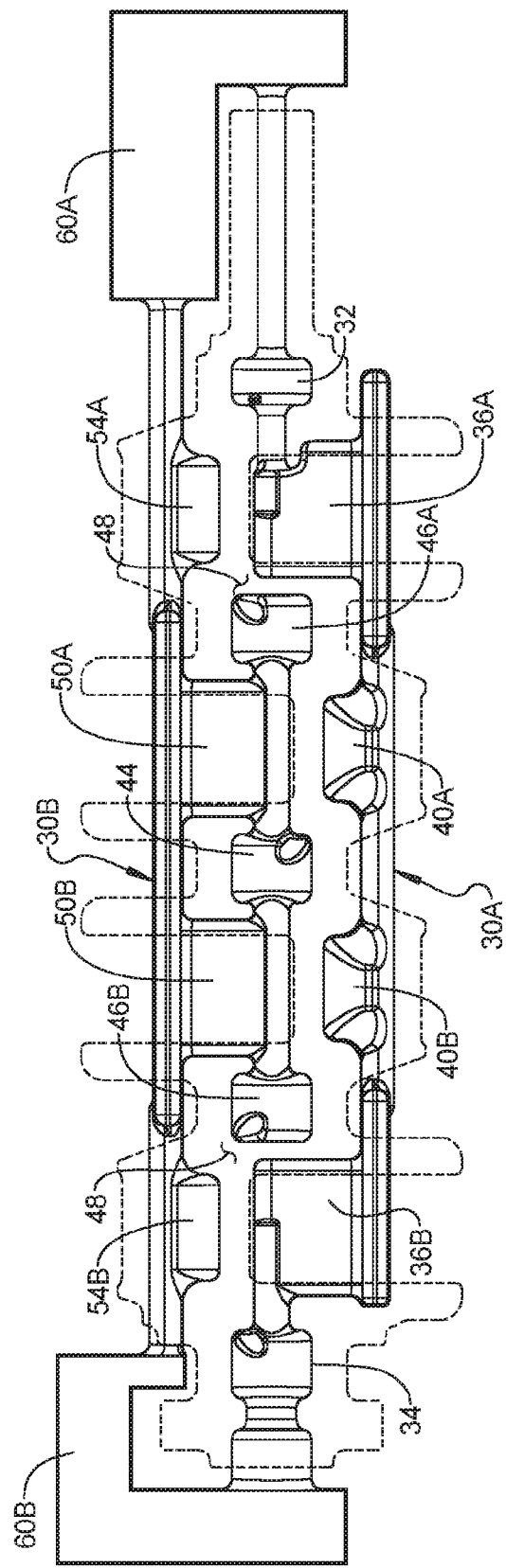
FIG. 3 is a plan view of a single-piece core design with the crankshaft shown in phantom for illustrative purposes.

In the embodiment shown in FIG. 2, the core structure 30 is made up of two separate core members 30A, 30B. As an alternative, as illustrated in FIG. 3, the core structure 30' can be made as a single core design wherein a pair of bridge core segments 60A, 60B connect the ends of the core members 30A and 30B.

Figure 4:
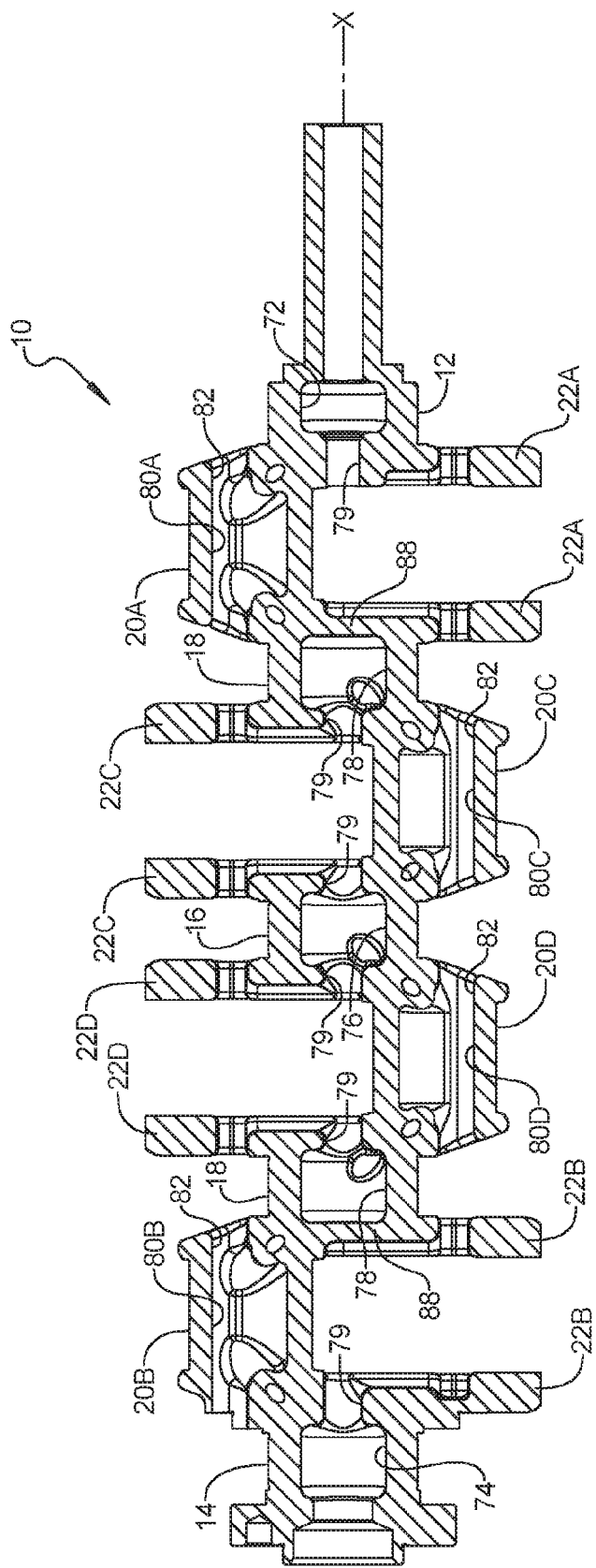
FIG. 4 is a longitudinal cross-sectional view of an exemplary cast crankshaft showing the hollow sections formed using the core structure according to the principles of the present disclosure.

With reference to FIG. 4, a longitudinal cross-section of the cast crankshaft 10 using the core according to the principles of the present disclosure is shown. The crankshaft 10 includes a hollow section 72 within the front main bearing journal 12, a hollow section 74 within the rear main bearing journal 14, a hollow section 76 within the center main bearing journal 16 and a pair of hollow sections 78 within the pair of intermediate main bearing journals 18 that are all linearly aligned along the center axis X. The hollow sections 72-78 are each formed by the main bearing core segments 32, 34, 44, 46A and 46B, respectively. Each of the hollow sections 72-78 are connected to at least one opening 79 that has an opening dimension in a direction orthogonal to the longitudinal axis X that is smaller than the cross-sectional dimension of the hollow sections 72-78 in a direction orthogonal to the longitudinal axis X. The openings 79 are formed by the pass-through core segments 38A, 38B, 52A-52D. The cast crankshaft 10 includes a pair of hollow sections 80A, 80B within the end crank pins 20A, 20B and a pair of hollow sections 80C, 80D within the intermediate crank pins 20C, 20D. The hollow sections 80A-80D are formed by the crank pin core segments 40A, 40B, 54A, 54B of the core structure 30. Each of the hollow sections 80A-80D are connected to an opening 82 that has an opening dimension which is smaller than the cross-sectional dimension in a direction orthogonal to the longitudinal axis X of the hollow sections 80A-80D. The openings 82 are formed by pass-through core segments 42A, 42B, 41, 56A, 56B. As mentioned above, each of the counterweights 22A-22D can be provided with hollow sections or openings therethrough 84 that are formed by extensions of the counterweight core segments of the core structure 30.

The pair of void regions 48 that are provided between the pair of intermediate main bearing journal core segments 46A, 46B and the counterweight core segments 36A, 36B define a closed end 88 of the hollow sections 78. This as-cast closed end feature 88 blocks flow of air and oil from going through the main bearing journal from the end bays to the center bays of the engine crankcase and vice versa. The addition of the cast closed end feature 88 eliminates the need for additional machining and for holes to be plugged by separate operations.

Figure 5:
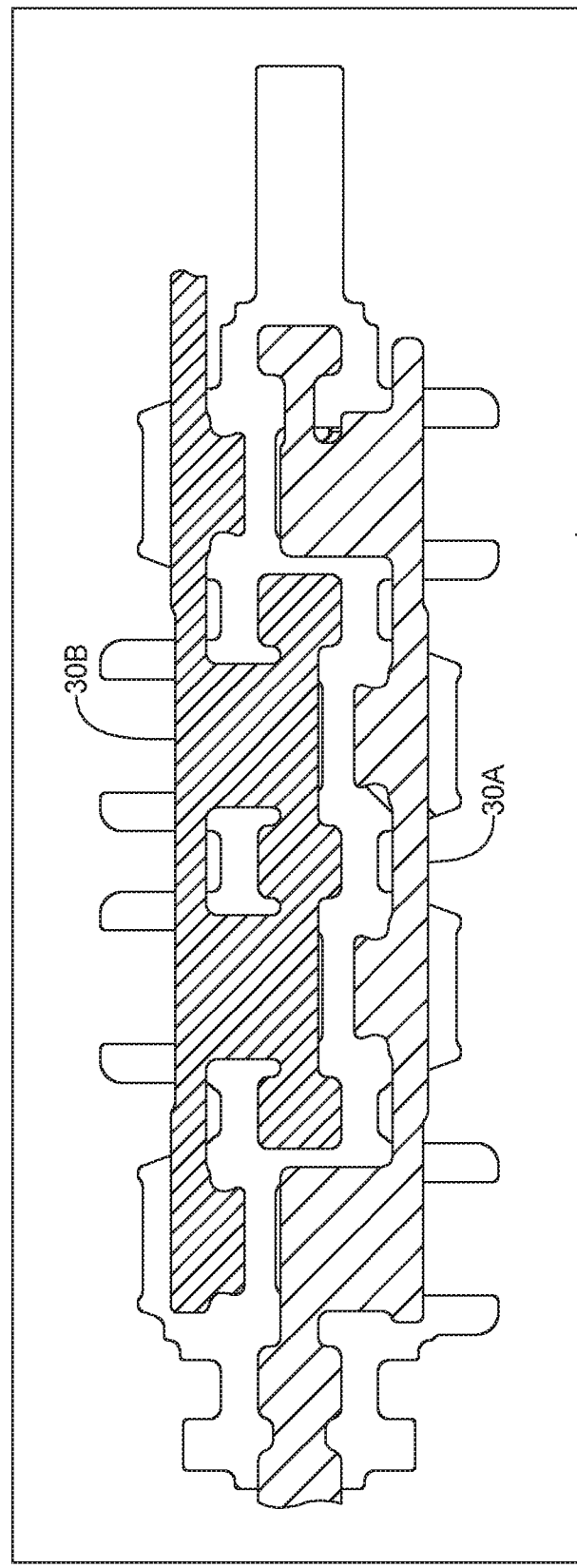
FIG. 5 is a schematic diagram of a casting die with the core structure according to the principles of the present disclosure.

As illustrated in FIG. 5, the core structure 30 is placed in a molding die cavity 100 and molten metal is poured into the cavity around the core structure 30. The molten metal is allowed to cool and the molded crankshaft 10 is removed from the die cavity 100. The molded crankshaft 10 is then shaken and otherwise treated to remove the core material from the hollow sections of the crankshaft 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A core structure for a cast crankshaft having a pair of end main bearing journals, a plurality of intermediate main bearing journals, a plurality of crank pins connected between the pair of end main bearing journals and the plurality of intermediate main bearing journals, and a plurality of counterweights connected to the plurality of crank pins, the core structure comprising:
   a pair of end main bearing core segments;
   a first pair of counterweights core segments connected to the pair of end main bearing core segments by a first pair of pass-through core segments;
   a pair of intermediate crank pin core segments connected to the first pair of counterweight core segments by a second pair of pass-through core segments;
   a pair of intermediate main bearing journal core segments adjacent to the first pair of counterweight core segments and having void regions between the pair of intermediate main bearing journal core segments and the first pair of counterweight core segments; and
   a second pair of counterweight core segments connected to the pair of intermediate main bearing journal core segments by a third pair of pass-through core segments.

2. The core structure according to claim 1, further comprising a pair of end crank pin core segments connected to the second pair of counterweight core segments by a fourth pair of pass-through core segments.

3. The core structure according to claim 2, further comprising a pair of bridge core segments connecting said pair of end main bearing core segments to said pair of end crank pin core segments.

4. The core structure according to claim 2, wherein the second pair of counterweight core segments are each connected to a center main bearing core segment by a fifth pair of pass-through core segments.

5. The core structure according to claim 4, further comprising a pair of bridge core segments connecting the pair of end main bearing core segments to the pair of end crank pin core segments.

6. The core structure according to claim 4, wherein the pair of end main bearing core segments, the first pair of counterweight core segments, the first pair of pass-through core segments, the pair of intermediate crank pin core segments and the second pair of pass-through core segments are part of a first core member and the pair of intermediate main bearing journal core segments, the second pair of counterweight core segments, the third pair of pass-through core segments, the fourth pair of pass-through core segments, and the end crank pin core segments are part of a second core member separate from the first core member.

7. A cast crankshaft, comprising:
   a pair of end main bearing journals and a pair of intermediate main bearing journals all disposed along a center axis;
   a plurality of crank pins connected between the pair of end main bearing journals and the plurality of intermediate main bearing journals;
   a plurality of counterweights connected to the plurality of crank pins;
   wherein said pair of intermediate main bearing journals include a hollow center and said pair of intermediate main bearing journals have an opening on one side of said hollow center and disposed along the center axis, said hollow center having a larger cross sectional dimension in a direction orthogonal to the center axis than the opening and said pair of intermediate main bearing journals having a closed end along the center axis on an opposite side of said opening, wherein the closed end is formed unitary with and from a same material as a remainder of the crankshaft.

\* \* \* \* \*